(12) United States Patent
Quesada Saborio

(10) Patent No.: US 9,874,408 B2
(45) Date of Patent: *Jan. 23, 2018

(54) HEAT EXCHANGERS

(71) Applicant: Carlos Quesada Saborio, San José (CR)

(72) Inventor: Carlos Quesada Saborio, San José (CR)

(*) Notice: Subject to any disclaimer, the term of this patent is extended or adjusted under 35 U.S.C. 154(b) by 101 days.

This patent is subject to a terminal disclaimer.

(21) Appl. No.: 14/094,356

(22) Filed: Dec. 2, 2013

(65) Prior Publication Data

US 2014/0151008 A1 Jun. 5, 2014

Related U.S. Application Data

(60) Provisional application No. 61/731,715, filed on Nov. 30, 2012, provisional application No. 61/731,726, (Continued)

(51) Int. Cl.
| | |
|---|---|
| *F28F 13/12* | (2006.01) |
| *F28F 1/26* | (2006.01) |
| *F28D 1/047* | (2006.01) |
| *F28F 1/00* | (2006.01) |
| *F28F 1/12* | (2006.01) |

(Continued)

(52) U.S. Cl.
CPC .............. *F28F 1/006* (2013.01); *B23P 15/26* (2013.01); *F28D 1/0473* (2013.01); *F28F 1/022* (2013.01); *F28F 1/025* (2013.01); *F28F 1/12* (2013.01); *F28F 1/34* (2013.01); *F28F 17/005* (2013.01); *F28F 1/26* (2013.01); *F28F 2260/02* (2013.01);

(Continued)

(58) Field of Classification Search
CPC ........... F28D 2001/0273; F28D 1/0473; F28F 1/022; F28F 1/12; F28F 1/26
USPC ............. 165/125, 153, 177, 183, 109.1, 181
See application file for complete search history.

(56) References Cited

U.S. PATENT DOCUMENTS

| | | | |
|---|---|---|---|
| 384,202 A | 6/1888 | Grove | |
| 1,458,128 A * | 6/1923 | Curran | F28F 1/128 165/153 |

(Continued)

FOREIGN PATENT DOCUMENTS

| | | |
|---|---|---|
| DE | 2209325 | 9/1973 |
| DE | 3815647 | 12/1988 |

(Continued)

*Primary Examiner* — Leonard R Leo
(74) *Attorney, Agent, or Firm* — James Creighton Wray; Meera P. Narasimhan

(57) ABSTRACT

Heat exchanger (100) has one or several substantially flat and rigid elongated tubing elements (10), whereby the tubing elements (10) tilted while being helically wound, forming a substantially overall cylindrical structure having a central longitudinal axis (X). Tubing elements (10) are tilted spirally curved around the central longitudinal axis (X). Several elements are interleaved in a structure. The tubing elements (10) have a plurality of fins (60) on at least one of the outer surfaces (42, 52) of first (40) and/or second (50) side wall. Fins (60) are at least partially covered by a covering wall (70, 80). The tubing elements (10) are at least partially tilted or at least partially tilted and sloped and at least partially helically wound and/or twisted so as to form at least a part of a helical structure, an overall cylindrical structure and/or a cylindrical shape.

15 Claims, 11 Drawing Sheets

Related U.S. Application Data filed on Nov. 30, 2012, provisional application No. 61/731,738, filed on Nov. 30, 2012.

(51) Int. Cl.
*B23P 15/26* (2006.01)
*F28F 17/00* (2006.01)
*F28F 1/02* (2006.01)
*F28F 1/34* (2006.01)

(52) U.S. Cl.
CPC ...... *Y10T 29/4935* (2015.01); *Y10T 29/49391* (2015.01)

(56) References Cited

U.S. PATENT DOCUMENTS

| | | | |
|---|---|---|---|
| 1,721,284 A * | 7/1929 | Spery | F28F 1/12 165/153 |
| 1,791,528 A * | 2/1931 | Hull | F25B 39/04 165/132 |
| 1,826,344 A * | 10/1931 | Dalgliesh | F28D 9/0037 165/166 |
| 1,988,224 A * | 1/1935 | Wendel | F28F 1/26 165/181 |
| 1,992,561 A * | 2/1935 | Wendel | F28F 1/26 165/181 |
| 2,834,582 A * | 5/1958 | Kablitz | F28F 3/04 165/166 |
| 3,662,582 A | 5/1972 | French | |
| 3,692,100 A | 9/1972 | Gallagher, Jr. | |
| 3,727,682 A * | 4/1973 | Pasternak | F28F 1/12 165/183 |
| 4,171,015 A * | 10/1979 | Bucey | F28F 1/26 165/181 |
| 4,341,088 A | 7/1982 | Mei et al. | |
| 4,349,489 A | 9/1982 | Gaget | |
| 4,397,331 A | 8/1983 | Medlar | |
| 4,860,993 A | 8/1989 | Goode | |
| 5,490,559 A * | 2/1996 | Dinulescu | F28B 1/06 165/183 |
| 5,505,257 A * | 4/1996 | Goetz, Jr. | F28F 1/126 165/183 |
| 5,765,630 A * | 6/1998 | Bloomer | F28D 1/024 165/121 |
| 5,775,187 A * | 7/1998 | Nikolai | F28F 1/26 407/113 |
| 6,250,602 B1 | 6/2001 | Jansen | |
| 6,272,867 B1 | 8/2001 | Barrash et al. | |
| 6,279,333 B1 | 8/2001 | Cilli et al. | |
| 6,332,327 B1 | 12/2001 | Street et al. | |
| 6,481,216 B2 | 11/2002 | Simmons et al. | |
| 6,546,999 B1 * | 4/2003 | Dienhart | F28D 1/0476 165/177 |
| 6,564,563 B2 | 5/2003 | Goth et al. | |
| 6,637,452 B1 | 10/2003 | Alman | |
| 6,644,056 B2 | 11/2003 | Goth et al. | |
| 6,647,735 B2 | 11/2003 | Street et al. | |
| 6,662,588 B2 | 12/2003 | Houk et al. | |
| 6,688,125 B2 | 2/2004 | Okamoto et al. | |
| 6,698,218 B2 | 3/2004 | Goth et al. | |
| 6,729,388 B2 * | 5/2004 | Emrich | F02B 29/0456 165/183 |
| 6,742,343 B2 | 6/2004 | Matanog et al. | |
| 6,848,670 B2 | 2/2005 | Haunhorst | |
| 6,973,794 B2 | 12/2005 | Street et al. | |
| 7,000,422 B2 | 2/2006 | Street et al. | |
| 7,013,655 B2 | 3/2006 | Des Champs | |
| 7,047,753 B2 | 5/2006 | Street et al. | |
| 7,080,521 B2 | 7/2006 | Ludwig et al. | |
| 7,142,424 B2 * | 11/2006 | Malone | F28F 1/24 165/104.33 |
| 7,228,691 B2 | 6/2007 | Street et al. | |
| 7,254,956 B2 | 8/2007 | Matanog et al. | |
| 7,260,946 B2 | 8/2007 | Ludwig et al. | |
| 7,266,961 B2 | 9/2007 | Ludwig et al. | |
| 7,270,278 B2 | 9/2007 | Street et al. | |
| 7,320,225 B2 | 1/2008 | Street et al. | |
| 7,406,834 B2 | 8/2008 | Williams | |
| 7,448,409 B2 | 11/2008 | Micheel | |
| 7,461,516 B2 | 12/2008 | Leadingham et al. | |
| 7,549,462 B2 * | 6/2009 | Nuris | B01J 19/0013 165/145 |
| 7,637,012 B2 * | 12/2009 | Thors | F28F 1/42 165/181 |
| 7,849,915 B2 * | 12/2010 | Kawakubo | F28F 1/022 165/177 |
| 9,109,813 B2 * | 8/2015 | Jensen | F16L 9/19 165/145 |
| 2002/0023737 A1 * | 2/2002 | Hao | F28F 3/02 165/185 |
| 2006/0117773 A1 | 6/2006 | Street et al. | |
| 2007/0125528 A1 | 6/2007 | Fakheri | |
| 2007/0186569 A1 | 8/2007 | Street et al. | |
| 2012/0160465 A1 | 6/2012 | Webb | |

FOREIGN PATENT DOCUMENTS

| | | | |
|---|---|---|---|
| DE | 202008006379 | 7/2008 | |
| EP | 0640803 | 3/1995 | |
| EP | 1840494 | 10/2007 | |
| GB | 117529 A | 7/1918 | |
| GB | 1390782 | 4/1975 | |
| JP | 2002153931 | 5/2002 | |
| JP | 2004218954 | 8/2004 | |
| WO | WO 89/06774 | 7/1989 | |
| WO | 9416272 A1 | 7/1994 | |
| WO | WO 9416272 A1 * | 7/1994 | B21D 53/06 |
| WO | 2011002711 A1 | 1/2011 | |

* cited by examiner

HEAT EXCHANGERS

This application claims the benefit of U.S. Provisional Application Nos. 61/731,715, 61/731,726 and 61/731,738, filed Nov. 30, 2012, which are hereby incorporated by reference in their entirety as if fully set forth herein.

BACKGROUND OF THE INVENTION

The present invention relates to heat exchangers having one or several substantially flat and rigid elongated tubing elements.

In the technical field of heat exchangers such as evaporators, condensers and radiators and coolers there have been many attempts to provide compact and energy efficient heat exchangers. A heat exchanger is hereby generally known to provide for an exchange of thermal energy between a first medium such as, for example, water and/or a cooling agent, and a second medium such as, for example, air.

For instance, EP 1 840 494 A2 discloses a heat exchanger, whereby the heat exchanger comprises a profile having two flat tubes with several channels and whereby the tubes are connected by means of a bar. The profile is a one-piece profile and may consist of aluminium or an aluminium alloy.

Moreover, DE 20 2008 006 379 U1 discloses an aluminium or aluminium alloy profile, which can be used for tubes for heat exchangers. The profile has a central channel and several further channels arranged around the central channel.

DE 2 209 325 discloses a tube for heat exchangers having a helical structure. Furthermore, DE 2 209 329 discloses heat exchanger tubes having ribs on the inner side and the outer side of the tube.

Additionally GB 1 390 782 discloses a heat-exchange tubing having spaced metal fins projecting inwardly of the tubing from the wall sections of the tubing and extending longitudinally of the tubing.

Further, EP 0 640 803 A1 relates to heat transfer coil, where a second piece of tubing is wound around the first piece of tubing while the first piece is straight and where the first piece of tubing is then formed to define the overall coil shape and then the first and second pieces of tubing internally sized by internal pressurization to also force the two pieces of tubing to intimate contact with each other.

However, it is still desirable to improve the already known technical solutions in the field of heat exchangers.

Needs exist for improved heat exchangers.

SUMMARY OF THE INVENTION

It is therefore an object for the present invention to improve heat exchangers, in particular in that the efficiency of the heat exchanges increases and that the overall structure of the heat exchangers is improved and simplified and allows a more compact structure of the heat exchanger means.

The above object is solved according to the present invention by heat exchanger means with the following features. Accordingly, a heat exchanger means comprising several substantially flat and rigid elongated tubing elements is provided, whereby the tubing elements are forming a substantially overall cylindrical structure having a central longitudinal axis and that the tubing elements are spirally curved around the central longitudinal axis and interleaved in the structure, whereby the tubing elements have a plurality of fins in at least one of the outer surfaces of the first side wall and/or of the second side wall and whereby the fins are at least partially covered by covering wall, whereby the tubing elements are at least partially tilted or at least partially tilted and sloped and at least partially helically wound and/or twisted so as to form at least a part of a helical structure, whereby preferably the helical structure has an overall cylindrical structure and/or that the helical structure is formed in a cylindrical shape.

The tubing element, having a plurality of fins on at least one of the outer surfaces of the first side wall and/or of the second side wall and whereby the fins are at least partially covered by a covering wall, increases the tubing element surface for a better heat exchange between said second medium, such as air, and the heat exchanger.

The helical structure of the tubing element is determined merely by variables radius r, angle $\alpha$ and angle $\beta$. Radius r defines the distance between the center of the tubing element and the central longitudinal axis X of the heat exchanger. Angle $\alpha$ defines the slope of the tubing element and extends between the central longitudinal axis X of the heat exchanger and the central axis Z of the tubing element. Angle $\beta$ defines the tilt of the tubing element and extends between the central longitudinal axis X of the heat exchanger and the central transversal axis Y of the tubing element.

Therefore, due to the tilted orientation of the tubing element, there are almost no horizontal surfaces of the tubing element within the heat exchanger. Natural condensate from air moisture disappears very quickly, because of the tilted surfaces that result from each tube element being tilted while at least partially helically wound and/or twisted. Natural condensate from air moisture disappears to the outside surface of the heat exchanger, because of the sloped surfaces tilted orientation of the tubing element. So, freezing of condensate from air moisture between each of said tubing elements can be minimized.

Compared to the prior art, the tubing element, being tilted while at least partially helically wound and/or twisted so as to form at least a part of a helical structure, is more efficient with less material. Also the heat exchanger needs a smaller volume in the whole heat exchanger system, due to the compact set of tubing elements.

Further, this tubing element, being tilted while being at least partially helically wound and/or twisted so as to form at least a part of a helical structure, effects a better interaction between a second medium such as air and the surface of the tubing element, due to the tilted orientation of the tubing element.

Such a tubing element for a heat exchanger may be an elongated heat exchanger microchannel tube. Such an elongated heat exchanger microchannel tube may have a first and a second open end. There may be relatively large parallel opposite side walls of the microchannel tube with generally flat surfaces, which are joined with relatively small opposite edge walls between the side walls. These edge walls may be convexly curved.

Heat transfer vapor or fluid may fill a heat exchanger microchannel tube and may flow from one end of the microchannel tube to the other end. The term microchannel is also known as microport.

A second medium such as air may flow around the outer sides of the tubing element and may transport the heat from the tube away or vice versa.

By providing a plurality of fins on at least one of the outer surfaces of the first side wall and/or of the second side wall the surface for heat exchange is increased. Thus, also the efficiency of the heat exchanger may be significantly improved.

Moreover, it is possible that the width of the first side wall and the second side wall is approximately at least 10 times larger than the distance between the first side wall and the second side wall and/or that the first side wall and second side wall are connected respectively on both sides by a rounded connection wall.

The width of the first side wall and/or the second side wall may be equal and/or chosen within a range of about 10 mm to about 30 mm. Preferably, the width of the first side wall and/or the second side wall may be about 15 mm.

The distance between the first side wall and the second side wall may be chosen respectively, i.e. within a range of about 1 mm to about 3 mm. Preferably the distance may be about 1.5 mm.

Additionally, it is possible that the tubing element is at least partially tilted or at least partially tilted and sloped and at least partially helically wound and/or twisted so as to form at least a part of a helical structure, whereby preferably the helical structure has an overall cylindrical structure and/or that the helical structure is formed in a cylindrical shape.

In particular, the structure according to the present invention of heat exchangers allows a more efficient heat exchange and a more compact structure of heat exchangers.

The heat exchanger may be embodied as a heat exchanger.

It is possible that the fins are arranged between the covering wall and at least one of the outer surfaces of the first side wall and/or of the second side wall and that the covering wall and the outer surface are substantially parallel.

Furthermore, it is possible that the interleaved tubing elements are arranged one upon the other.

The first ends of adjacent tubing elements may be connected by a connecting means, whereby preferably the connecting means is a connector tubing element, which is for instance at least partially U-shaped bended.

Additionally, the second ends of adjacent tubing elements may be connected by a connecting means, whereby preferably the connecting means comprises plurality of connector tubing elements and a central connector portion, whereby for instance the connector tubing elements and the central connector portion are arranged in star-shaped manner.

Moreover, it is possible that the tubing element has a plurality of fins on both of the outer surfaces of the first side wall and of the second side wall.

The fins may be monoblock fins.

Further, the fins may be perpendicularly arranged on the at least one of the outer surfaces of the first side wall and/or of the second side wall.

It is possible that the fins are inclined arranged on the at least one of the outer surfaces of the first side wall and/or of the second side wall, whereby exemplarily the angle between the fins and the outer surface is substantially perpendicular.

Additionally, the fins may merely extend along the whole width of at least one of the outer surfaces of the first side wall and/or of the second side wall and/or are curved.

Furthermore, it is possible that the fins are arranged along a curve extending along the whole width of at least one of the outer surfaces of the first side wall and/or of the second side wall and/or are curved, whereby between the fins being arranged along a curve is a pitch and/or gap.

It is possible that the fins are arranged in a plurality of rows, preferably substantially parallel rows and/or preferably along at least a part of the length of the tubing element.

Further, the tubing elements may comprise at least one microchannel, preferably several microchannels with a round or circular cross-section and/or several microchannels with an angular cross-section, exemplarily several microchannels with a triangular cross-section and/or several microchannels with quadrangular cross-section are provided.

Additionally, at least some of the microchannels may be arranged with an off-set to each other, whereby exemplarily all microchannels are arranged with an off-set to each other, whereby preferably the off-set causes chamfers and/or grooves within the first side wall and/or the second side wall.

Moreover, it is possible that the heat exchangers are condensers or evaporators or radiators or coolers.

Further, the present invention relates to a tubing element with the features of claim 15. Accordingly, a tubing element for a heat exchanger is provided comprising the tubing element features as defined in any of claims 1 to 14.

These and further and other objects and features of the invention are apparent in the disclosure, which includes the above and ongoing written specification, with the claims and the drawings.

Further details and advantages of the present invention shall be described herein after with respect to the drawings.

DETAILED DESCRIPTION

Figure 1:
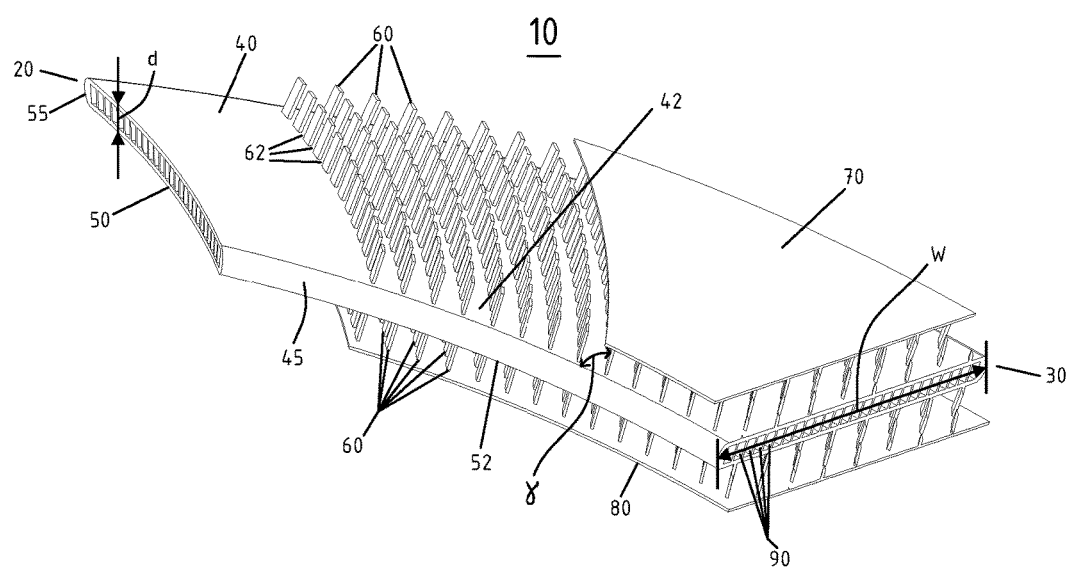
FIG. 1 is a perspective view of a part of the tubing element according to the present invention in detail

FIG. 1 shows a detailed perspective view of an elongated tubing element 10 having a plurality of microchannels 90 with quadrangular cross-section.

The tubing element is a rigid elongated heat exchanger tubing having at least a first end 20 and a second end 30 and having a first side wall 40 and second side wall 50. The first side wall 40 and the second side wall 50 are arranged substantially parallel to each other and the distance d between the first side wall 40 and the second side wall 50 is considerably smaller than the width W of the first side wall 40 and the second side wall 50. Thus, the tubing element has a substantially overall flat tubing structure.

The width W of the first side wall 40 and the second side wall 50 is approximately at least ten times larger than the distance d between the first side wall 40. The second side wall 50 and the first side wall and the second side wall 40, 50 are connected respectively on both sides by a rounded connection wall 45, 55.

The width W of the first side wall 40 and the second side wall 50 is equal and chosen within a range of about 10 mm to 30 mm.

In the embodiment shown in FIG. 1, the width W of the first side wall and the second side wall 40, 50 is about 15 mm. The distance d is thus chosen with a value of about 1.5 mm.

Normally, the distance between the first side wall 40 and the second side wall 50 is chosen respectively to the width values of the first side wall 40 and the second side wall 50, i.e. normally within a range of about 1 mm to 3 mm.

Figure 2A:
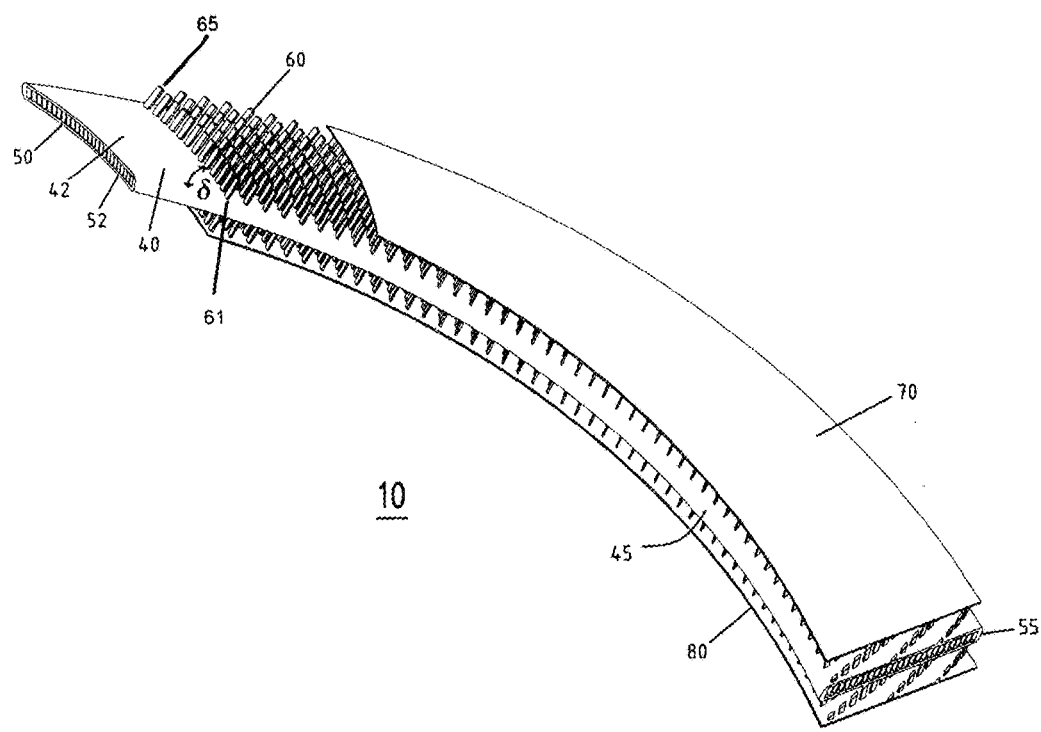
FIGS. 2a and 2b are a further perspective view of a part of the tubing element according to the present invention in detail in a first and second embodiment.

The tubing element 10 is at least partially tilted and sloped and also at least partially helically wound and twisted as shown in FIG. 2a so as to form at least a part of a helical structure (see FIG. 3), whereby the helical structure has an overall cylindrical structure and the helical structure is formed in a cylindrical shape.

Figure 3:
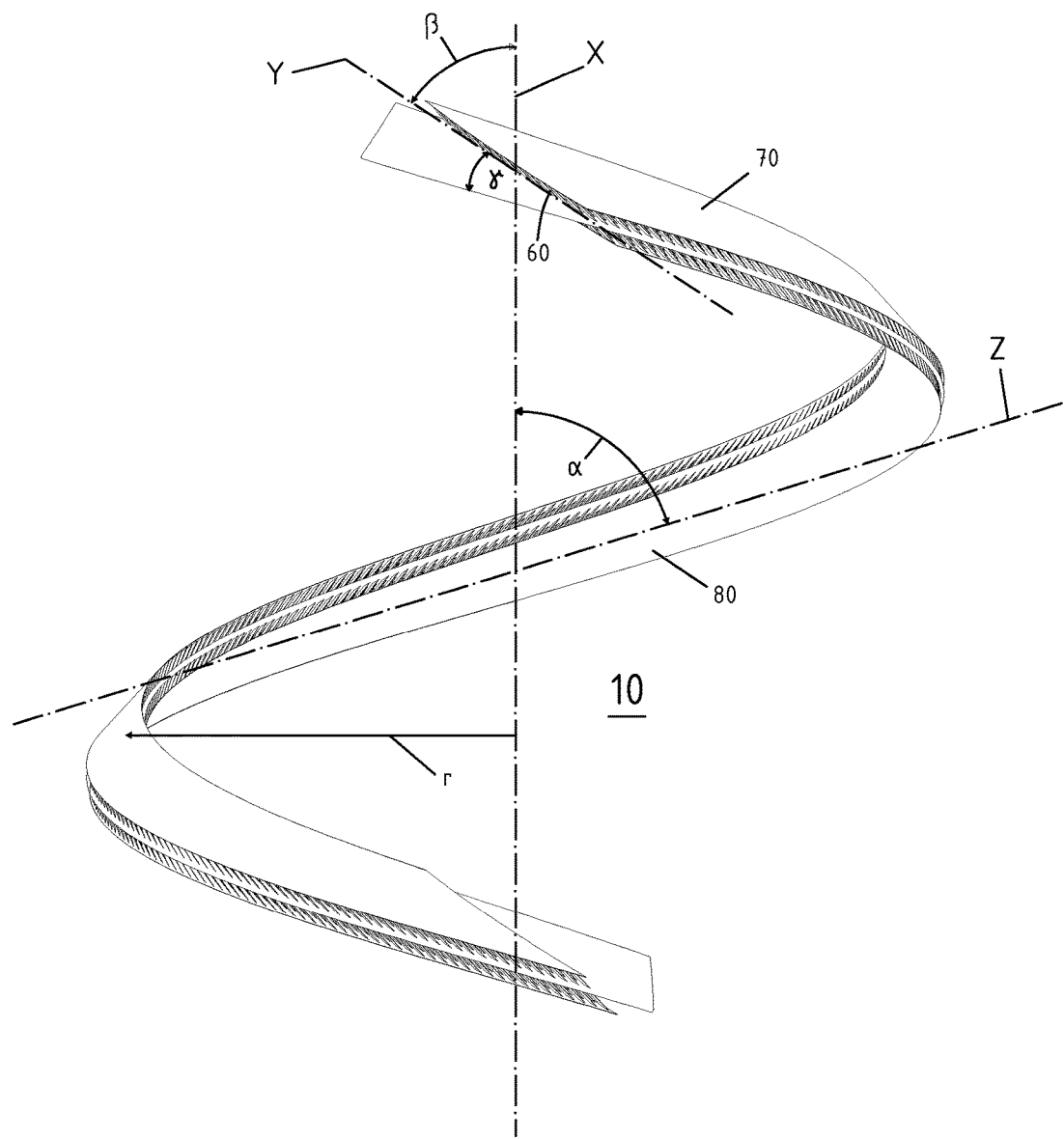
FIG. 3 is a further perspective view of a part of the tubing element according to the present invention in a helical structure.

As best seen in FIG. 3, the tubing element 10 is forming an overall cylindrical structure having a central longitudinal axis X, said tubing element 10 being spatially curved around the central longitudinal axis X and interleaved in the structure (see FIG. 4) of several equal tubing elements 10. The tubing elements 10 have a plurality of fins 60 on both outer surfaces 42, 52 of the first side wall 40 and the second side wall 50, as can be seen in FIGS. 1, 2a and 3. The helical structure of the tubing element 10 is determined merely by variables radius r, angle α and angle β. Radius r defines the distance between the inner side wall 40 of the tubing element 10 at the intersection of the central axis Z and the central transversal axis Y, both of the tubing element 10 and the central longitudinal axis X of the heat exchanger 100. Angle α defines the slope of the tubing element 10 and extends between the central longitudinal axis X of the heat exchanger means 100 and the central axis Z of the tubing element 10. Angle β defines the tile of the tubing element 10 and extends between the central longitudinal axis X of the heat exchanger 100 and the central transversal axis Y of the tubing element 10.

The fins 60 are arranged between the covering walls 70, 80 and the outer surfaces 42, 52 of the first side wall 40 and the second side wall 50. Moreover, the covering wall 70, 80 and the outer surfaces 42, 52 of the first side wall 40 and the second side wall 50 are substantially parallel. However, the covering wall 70, 80 and the outer surfaces 42, 52 of the first side wall 40 and the second side wall 50 are not directly connected to each other so that e.g. a cooling medium may flow through the fins 60 arranged within the space provided by the covering wall 70, 80 and the outer surfaces 42, 52 of the first side wall 40 and the second side wall 50.

In particular, the cooling medium may enter the space also from the sides of the rounded connection walls 45, 55. In the embodiment shown in FIGS. 1 to 4, the fins 60 are perpendicularly arranged on the outer surfaces 42, 52 of the first side wall 40 and the second side wall 50.

Alternatively, it is possible that the fins 60 are inclined arranged on the outer surfaces 42, 52 of the first side wall 40 and the second side wall 50, whereby exemplarily the angle between the fin 60 and the outer surface 42, 52 is substantially perpendicular.

The fins 60 merely extend along the whole width of the outer surfaces 42, 52 of the first side wall 40 and the second side wall 50 and are curved. Furthermore, the fins 60 are arranged along a curve extending along the whole width of the outer surfaces 42, 52 of the first side wall 40 and the second side wall 50. Moreover, between the fins 60 several gaps 62 are provided. Through the gaps 62 the medium, e.g. a cooling or heating medium may pass.

The fins 60 and the curve of fin 60 and the connection walls 45, 55 are arranged such to each other that they enclose an angle γ. The angle γ is chosen in the embodiment shown in FIGS. 1 to 4 within a range about 30° to about 60°, here in an angle of about 45°.

Figure 4:
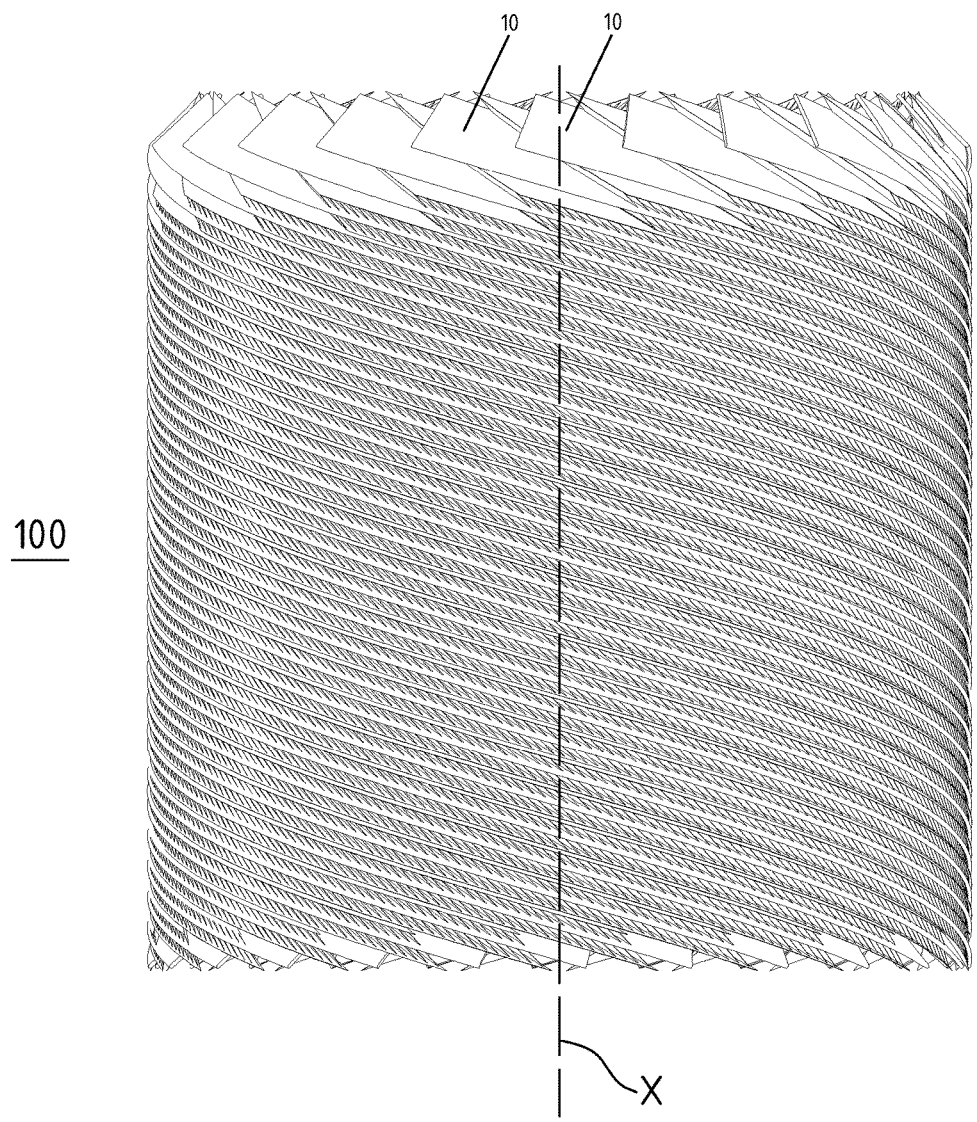
FIG. 4 is a side elevation of the heat exchanger in a first embodiment according to the present invention.
Figure 9:
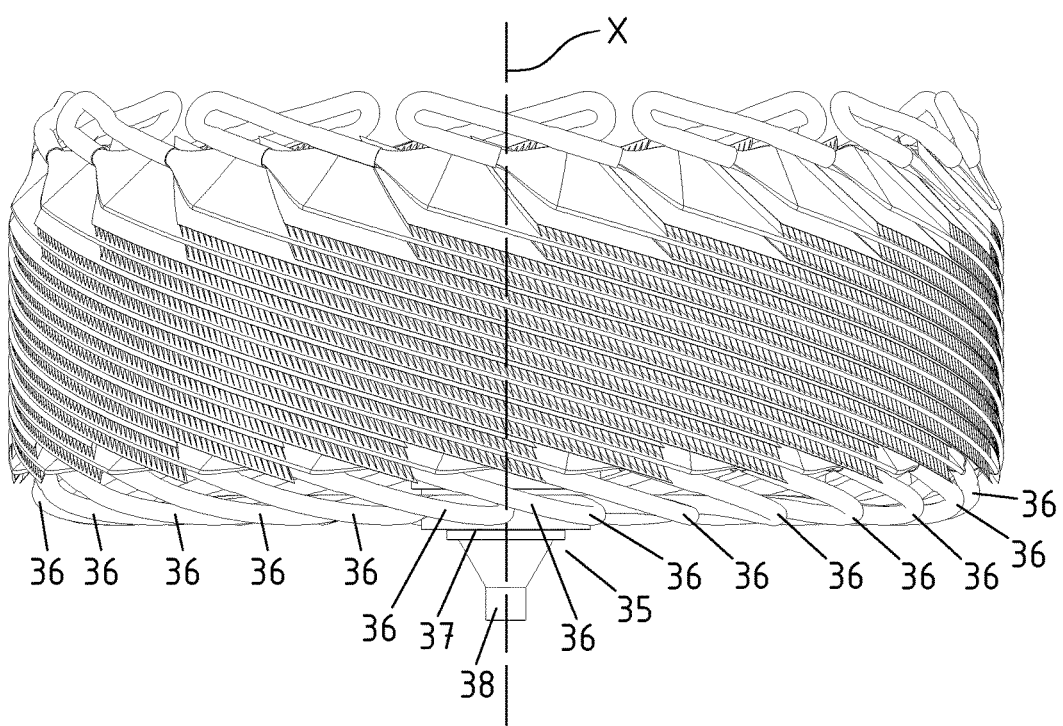
FIG. 9 is a side elevation of a heat exchanger according to the present invention.
Figure 10:
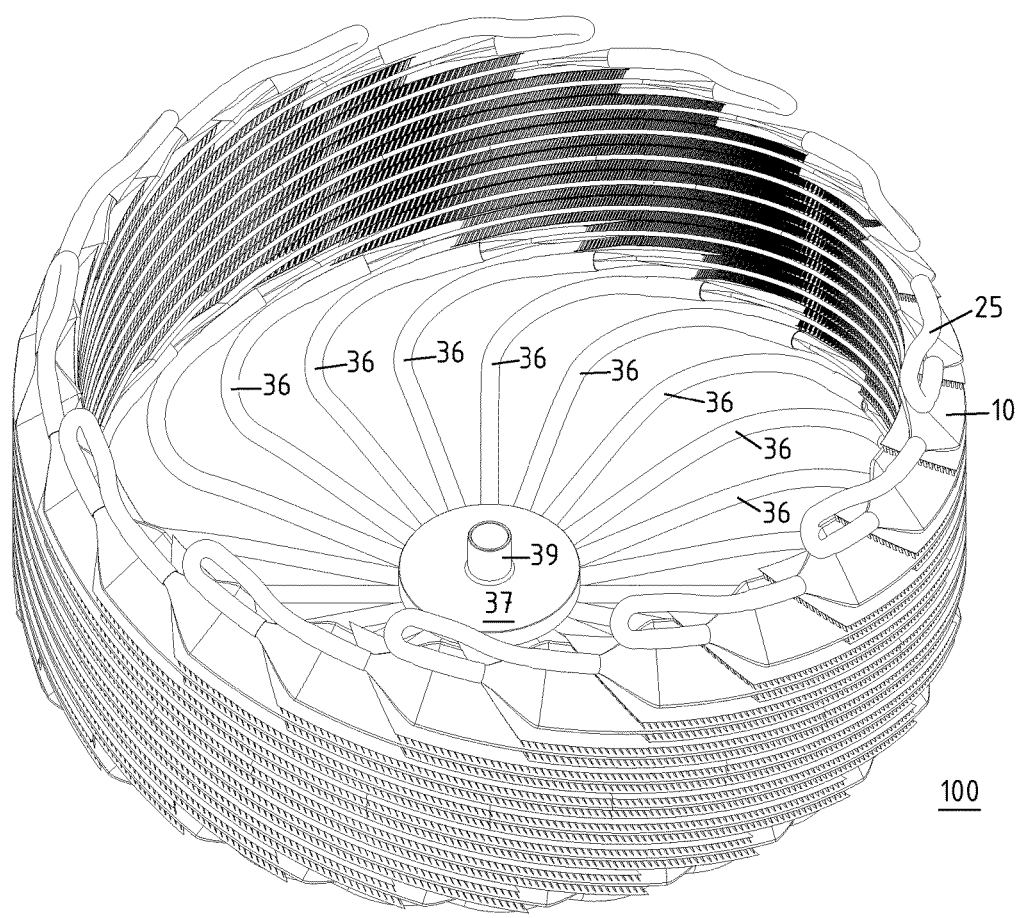
FIG. 10 is a perspective view of the embodiment of the heat exchanger according to FIG. 9.

An angle of about 45° between the fins 60 and the curve of fins 60 and at least one of the connection walls 45, 55 is considered to be substantially neutral, in particular as a neutral arrangement with respect to the interference with e.g. fans or the like, which may be connected or used together with the heat exchanger 100 comprising such tubing elements 10, as e.g. shown in FIGS. 4, 9 and 10.

Figure 2B:
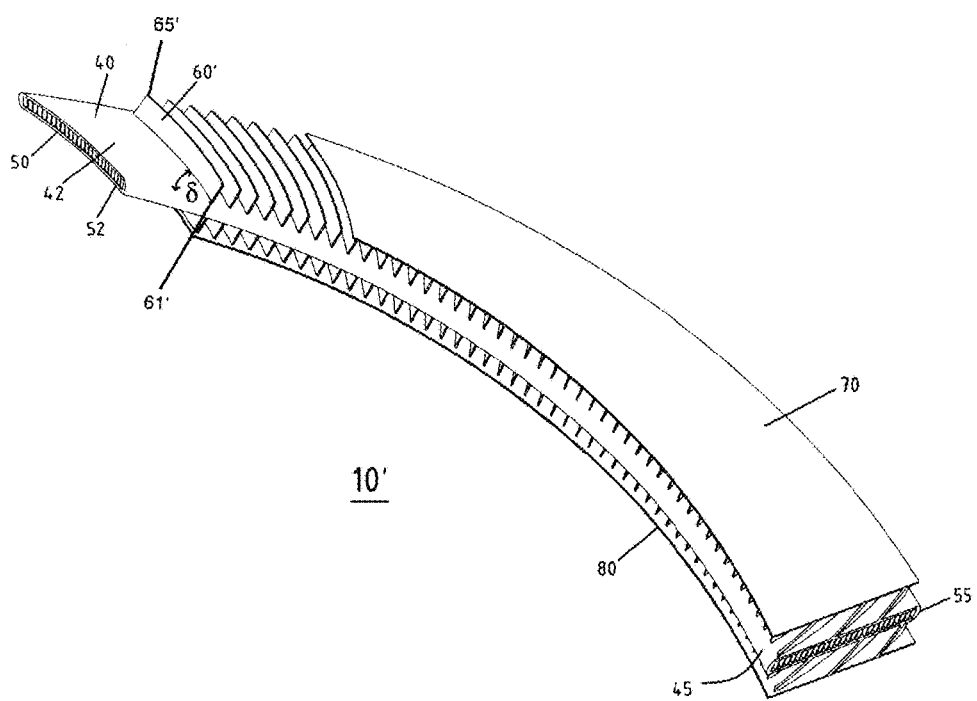

FIG. 2b shows an alternative embodiment of a tubing element 10', which is almost identical with the embodiment shown in FIG. 2a. The only difference is that the tubing element 10' comprises fins 60' which merely extend along the whole width W of the outer surfaces 42, 52 of the first side wall 40 and the second sidewall 50.

As can be seen in FIG. 3, the tubing elements 10 are tilted and sloped and helical wound and twisted so as to form a part of a helical structure, whereby this helical structure has an overall cylindrical structure.

These tubing elements are interleaved and arranged one upon the other to a heat exchanger 100, as shown in FIG. 4. Also, the central longitudinal axis is shown.

Figure 5:
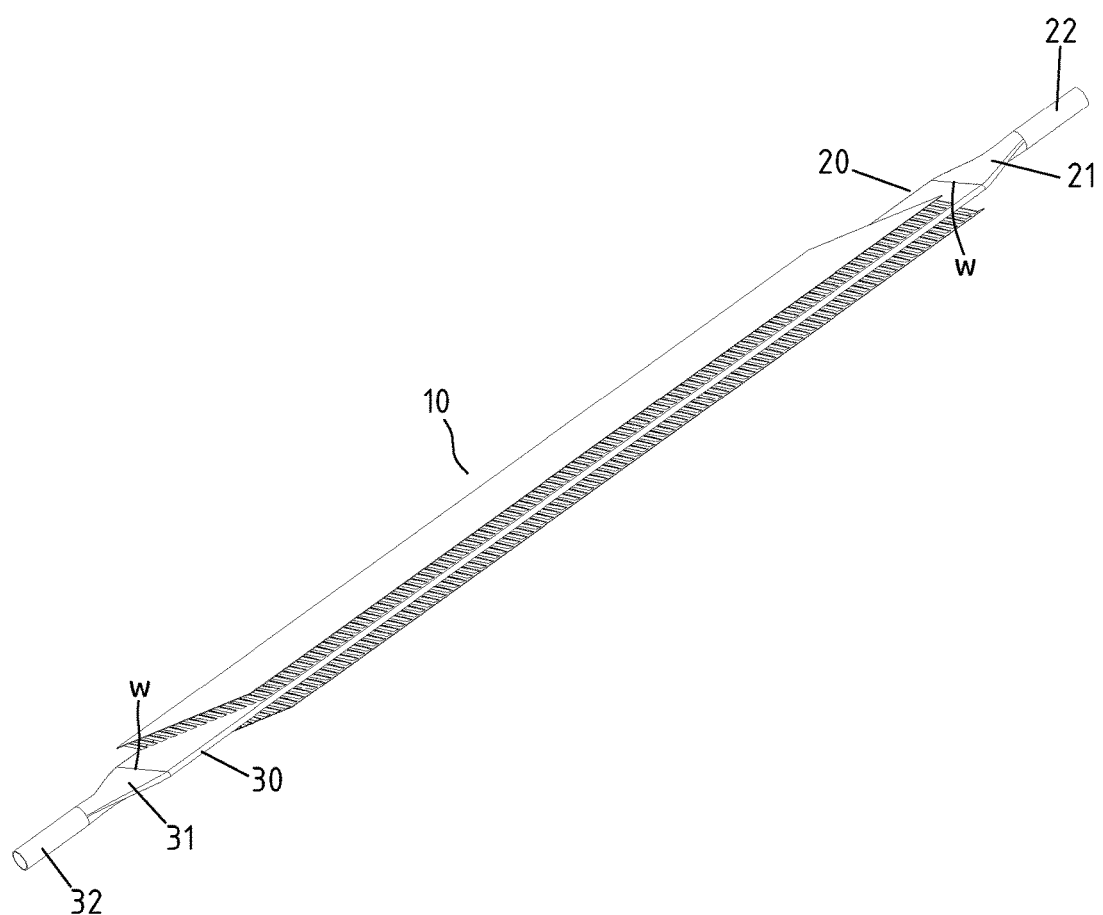
FIG. 5 is a perspective view of a tubing element for a heat exchanger with connecting means.

FIG. 5 shows a non-tilted and unwound rigid elongated tubing element 10 for heat exchanger 100 according to the present invention. The tubing element 10 has the same structural and functional features as described with respect to the tubing element 10 shown in FIGS. 1 to 4.

Moreover, the tubing element 10 comprises at its first end 20 and at its second end 30 a collecting portion 21, 31, which is reducing the width W of the first side wall 40 and the second side wall 50 to a smaller width.

The collecting portions 21, 31 are equipped with tubular elements 22, 32, i.e. tubular connectors with a circular cross-section by means of which the tubing element 10 may be connected with another tubing element or any connecting means, e.g. the first and second connecting means 25 and 35 as shown in FIGS. 7, 8, 9 and 10.

Figure 6:
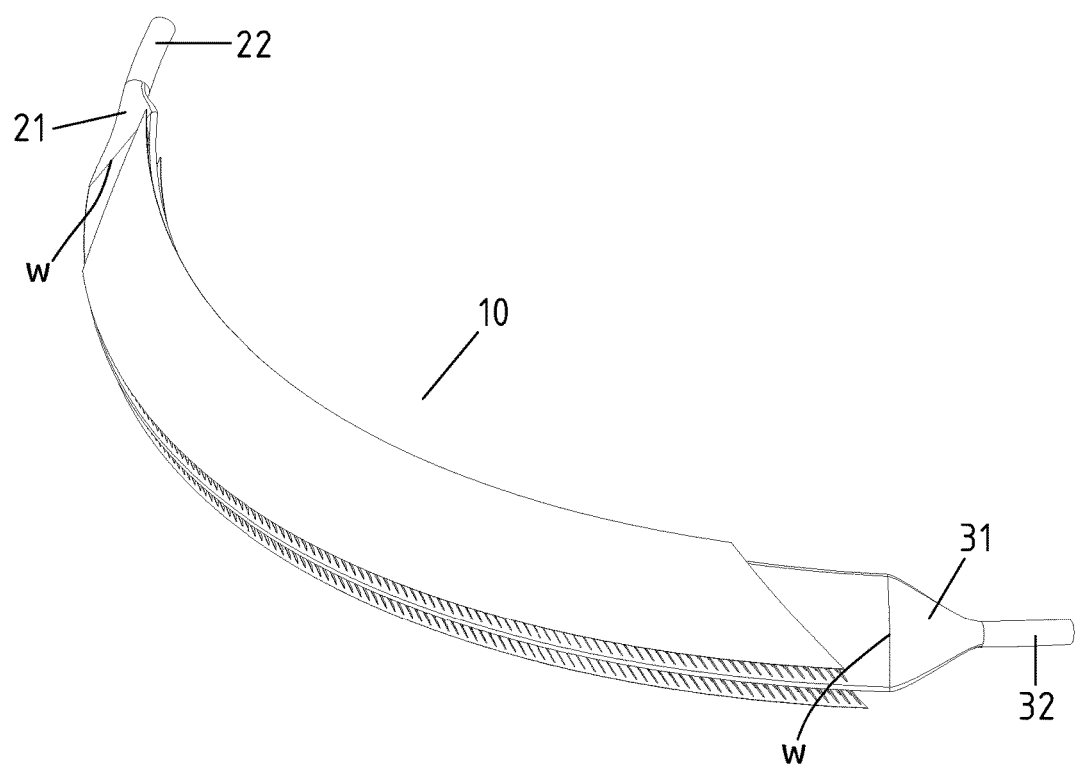
FIG. 6 is a further perspective view of the tubing element according to FIG. 5.

FIG. 6 shows a tubing element 10 according to FIG. 5, whereby the tubing element 10 shown in FIG. 6 has been partially tilted and sloped and partially helically wound and twisted so as to form at least a part of a helical structure.

After the at least partially tilting and sloping and the at least partially helically winding and twisting as described in connection with FIG. 6, the so formed rigid elongated tubing elements 10 for the heat exchanger 100 may be attached to another, equally formed further tubing element 10. Both tubing elements 10 are connected by a first connecting means 25. This connecting means 25 is a connector tubing element 25, which is U-shaped bended, see FIG. 7.

Figure 7:
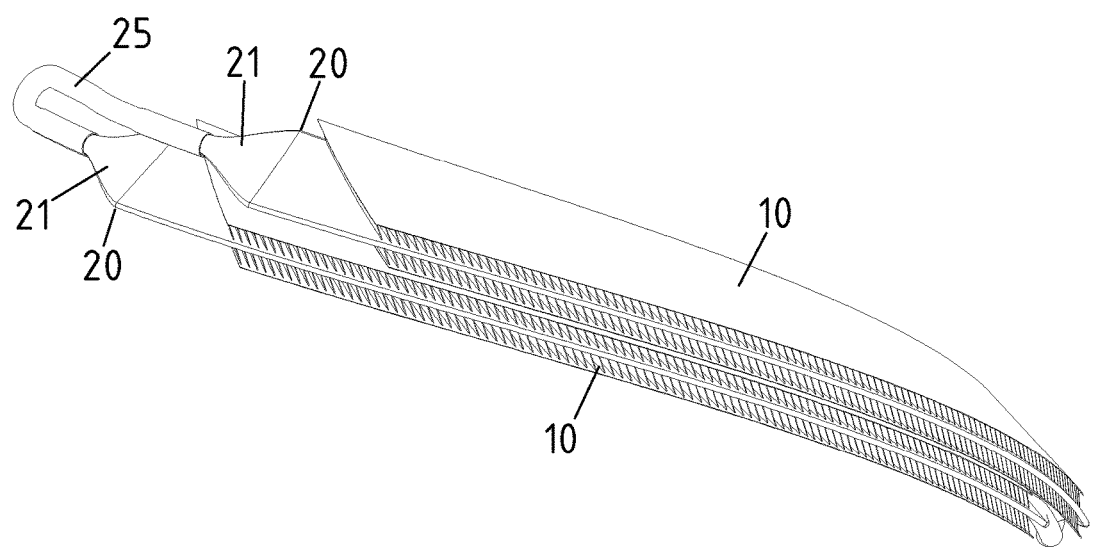
FIG. 7 is a perspective view of interconnected tubing elements according to the present invention for a heat exchanger.
Figure 8:
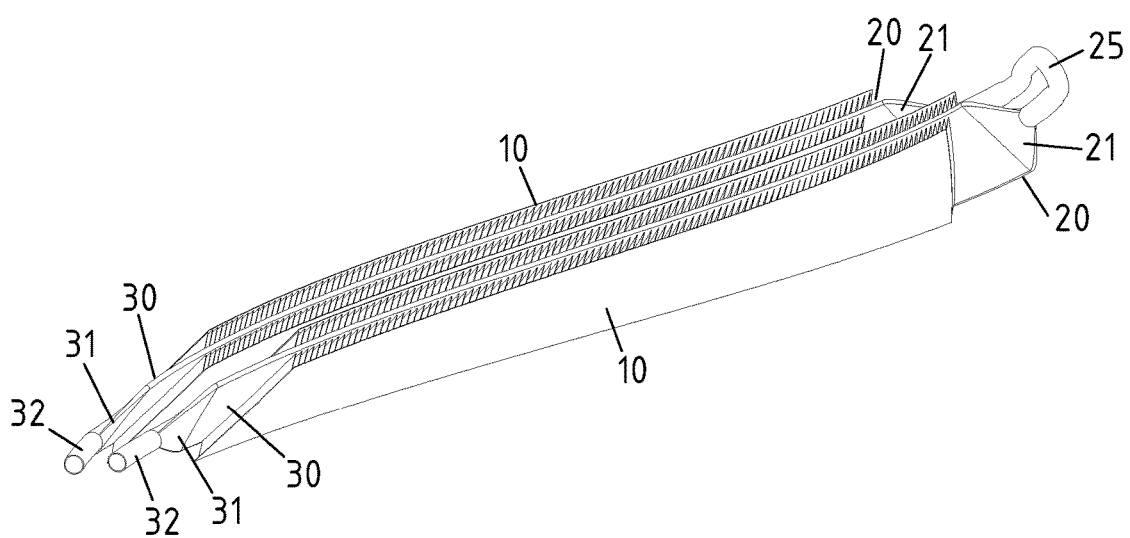
FIG. 8 is a further perspective view of interconnected tubing elements for the heat exchanger according to the present invention according to FIG. 7.

FIG. 8 is another perspective view of the arrangement of tubing elements as shown in FIG. 7.

The so connected tubing elements 10 may be further combined to an overall cylindrical structure of a heat exchanger 100, as shown in FIGS. 9 and 10. As can be seen in FIGS. 9 and 10, the second end 30 of adjacent tubing elements 10 are connected by a second connecting means 35. Also, the central longitudinal axis is shown in FIG. 9.

The second connecting means 35 comprises a plurality of connected tubing elements 36 and a central connector portion 37, whereby the connector tubing elements 36 and the central connector portion 37 are arranged in a star-shaped manner.

The connector tubing element 36 form alternatingly an inlet or an outlet. The inlet connector tubing elements 36 are connected with the inlet portion 38 of the central connector portion 37 and the outlet connector tubing elements 36 are connected with the outlet portion 39 of the central connector portion 38. In any case, inlet and outlet function may be interchanged, i.e. the inlet may be the outlet or vice versa.

While the invention has been described with reference to specific embodiments, modifications and variations of the invention may be constructed without departing from the scope of the invention, which is defined in the following claims.

I claim:

1. Heat exchanger apparatus (100) comprising
one or more substantially flat and rigid elongated finned tubing elements (10, 10') having a first side wall (40) and a second side wall (50) being arranged substantially parallel to each other, whereby the one or more finned tubing elements (10, 10') form a substantially overall cylindrical structure having a central longitudinal axis (X) and that the one or more finned tubing elements (10, 10') are curved around the central longitudinal axis (X),
whereby the one or more finned tubing elements (10, 10') have a plurality of fins (60, 60') on at least one of outer surfaces (42, 52) of a first side wall (40) and/or of a second side wall (50) and whereby the fins (60, 60') are angled and not perpendicular with respect to lengths of the one or more finned tubing elements (10, 10') to direct flow across the sidewalls (40, 50), connection walls (45, 55) on both sides between the first side wall (40) and the second side wall (50),
wherein the fins (60, 60') are angled with respect to the finned tubing element by two defining angles (γ, δ), wherein one angle (γ) of the two defining angles is an angle of the fins (60, 60') with respect to the connection walls (45, 55) of the finned tubing element, wherein another angle (δ) of the two defining angles is an angle of the fins (60,60') with respect to the outer surfaces (42, 52) of the first side wall (40) or the second side wall (50),
wherein the fins are covered by a covering wall (70, 80), whereby the one or more finned tubing elements (10, 10') are at least partially tilted, sloped, and helically wound and twisted so as to form at least a part of a helical structure, whereby the helical structure has an overall cylindrical structure and that the helical structure is formed in a cylindrical shape, wherein each of the fins is twisted between opposite endpoints of each fin and curved by an offset of a center part of a middle section of each fin with respect to the endpoints of each fin.

2. Heat exchanger apparatus (100) according to claim 1, wherein the fins (60,60') are arranged between the covering wall (70, 80) and at least one of the outer surfaces (42, 52) of the first side wall (40) or of the second side wall (50) and that the covering wall and the outer surface are substantially parallel.

3. Heat exchanger apparatus (100) according to claim 1, wherein interleaved plural similar finned tubing elements (10,10') arranged one upon the other.

4. Heat exchanger apparatus (100) according to claim 1, wherein first ends (20) of adjacent finned tubing elements (10,10') are connected by a first connector (25), whereby the first connector (25) is a first connector tubing element (25), which is at least partially U-shaped bended.

5. Heat exchanger apparatus (100) according to claim 1, wherein second ends (30) of adjacent finned tubing elements (10,10') are connected by a second connector (35), whereby the second connector (35) comprises a plurality of connector tubing elements (36) and a central connector portion, whereby the connector tubing elements (36) and the central connector portion (37) are arranged in star-shaped manner.

6. Heat exchanger apparatus (100) according to claim 1, wherein the one or more finned tubing element (10,10') has a plurality of fins (60,60') on both of the outer surfaces (42, 52) of the first side wall (40) and of the second side wall (50).

7. Heat exchanger apparatus (100) according to claim 1, wherein the fins are monoblock fins (60,60) that are formed integral with the side walls of the one or more finned tubing elements.

8. Heat exchanger apparatus (100) according to claim 1, wherein the fins (60, 60') are perpendicularly arranged on the at least one of the outer surfaces (42, 52) of the first side wall (40) or of the second side wall (50).

9. Heat exchanger apparatus (100) according to claim 1, wherein the fins (60, 60') are inclined arranged on at least one of the outer surfaces (42, 52) of the first side wall (40) or of the second side wall (50).

10. Heat exchanger apparatus (100) according to claim 1, wherein the fins (60, 60') extend along the whole width of at least one of the outer surfaces (42, 52) of the first side wall (40) or of the second side wall (50) and that the fins (60, 60') are arranged along a curve extending merely along a whole width of at least one of the outer surfaces (42, 52) of the first side wall (40) and/or of the second side wall (50), whereby between the fins (60) being arranged along a curve is a pitch or gap.

11. Heat exchanger apparatus (100) according to any claim 1, wherein the fins (60, 60') are arranged in a plurality of substantially parallel rows along at least a part of the length of the one or more finned tubing elements (10).

12. Heat exchanger apparatus (100) according to claim 1, wherein the one or more finned tubing elements (10, 10') comprise at least one microchannel or several microchannels with a round or circular cross-section or several microchannels with an angular cross-section, several microchannels with a triangular cross-section or several microchannels with quadrangular cross-section are provided.

13. Heat exchanger apparatus (100) according to claim 12, wherein at least some of the microchannels are arranged with an off-set (O) to each other, whereby the off-set causes chamfers or grooves within the first side wall (40) or the second side wall (50).

14. Heat exchanger apparatus (100) according to claim 1, wherein the heat exchanger (100) is a condenser or an evaporator or a radiator or a cooler.

15. The heat exchanger according to claim 1, the one or more finned tubing elements (10, 10') for a heat exchanger apparatus (100) comprising the one or more finned tubing elements being tilted while helically wound.

* * * * *